(12) United States Patent  
Choi

(10) Patent No.: US 11,152,834 B2  
(45) Date of Patent: Oct. 19, 2021

(54) MOTOR CONNECTOR AND MOTOR HAVING SAME

(71) Applicant: LG INNOTEK CO., LTD., Seoul (KR)

(72) Inventor: Dae Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 447 days.

(21) Appl. No.: 16/309,199

(22) PCT Filed: May 18, 2017

(86) PCT No.: PCT/KR2017/005154  
§ 371 (c)(1),  
(2) Date: Dec. 12, 2018

(87) PCT Pub. No.: WO2017/217664  
PCT Pub. Date: Dec. 21, 2017

(65) Prior Publication Data  
US 2019/0326793 A1    Oct. 24, 2019

(30) Foreign Application Priority Data

Jun. 15, 2016   (KR) .......................... 10-2016-0074249

(51) Int. Cl.  
*H02K 5/22* (2006.01)  
*H02K 5/10* (2006.01)  
(Continued)

(52) U.S. Cl.  
CPC ............... *H02K 5/225* (2013.01); *H02K 5/10* (2013.01); *H02K 7/085* (2013.01);  
(Continued)

(58) Field of Classification Search  
CPC ............ H02K 5/225; H02K 5/22; H02K 5/10; H02K 3/50; H02K 3/38; H02K 7/08;  
(Continued)

(56) References Cited

U.S. PATENT DOCUMENTS 5,616,975 A * 4/1997 May .................. H02K 5/225  
310/89  
2005/0082918 A1 * 4/2005 Hirt .................. F16H 61/28  
310/43  
(Continued)

FOREIGN PATENT DOCUMENTS

CN             1361575        7/2002  
CN           204706979       10/2015  
(Continued)

OTHER PUBLICATIONS

Kurokawa et al, Rotating Electric Machine, Mar. 28, 2018, Kayaba IND Co. LTD, JP 2015149852 (English Machine Translation) (Year: 2015).*

(Continued)

*Primary Examiner* — Quyen P Leung  
*Assistant Examiner* — Alexander A Singh  
(74) *Attorney, Agent, or Firm* — KED & Associates LLP

(57) ABSTRACT

A motor connector comprises: a wiring unit including an electric wire having a conductive wire exposed from an insulating sheath, and a terminal coupled to the conductive wire and having a terminal part formed on the end portion thereof; a base including a first molding part having the terminal part disposed therein, and a second molding part extending outwards from the first molding part and having a receiving space for receiving the conductive wire and a part of the insulating sheath adjacent to the conductive wire; a fixing member coupled to the second molding part and covering the sheath so as to fix the same; and a molding member filling the receiving space so as to seal the gap between the first molding part and the second molding part.

20 Claims, 7 Drawing Sheets

(51) Int. Cl.
*H02K 7/08* (2006.01)
*H01R 13/52* (2006.01)

(52) U.S. Cl.
CPC ...... *H01R 13/5202* (2013.01); *H01R 13/5219* (2013.01); *H01R 2201/10* (2013.01)

(58) Field of Classification Search
CPC .... H02K 7/085; H01R 13/5205; H01R 13/52; H01R 13/5202; H01R 13/521; H01R 13/5219; H01R 2201/10
USPC .......................................................... 310/71
See application file for complete search history.

(56) References Cited

U.S. PATENT DOCUMENTS

| | | | | |
|---|---|---|---|---|
| 2008/0150377 A1* | 6/2008 | Yamaguchi | ............ | H02K 5/225 310/71 |
| 2010/0187923 A1* | 7/2010 | Migita | .................... | H02K 5/225 310/71 |
| 2010/0289354 A1 | 11/2010 | Ishizue et al. | | |
| 2011/0006625 A1* | 1/2011 | Fujii | ...................... | H02K 5/225 310/71 |
| 2013/0330217 A1* | 12/2013 | Enami | ..................... | F04B 39/14 417/410.1 |
| 2016/0165736 A1* | 6/2016 | Tsuboi | ................... | H02K 11/33 310/71 |

FOREIGN PATENT DOCUMENTS

| | | |
|---|---|---|
| DE | 10-2015-211459 | 1/2016 |
| EP | 0 688 087 | 12/1995 |
| JP | H 10-285878 | 10/1998 |
| JP | H 11-275793 | 10/1999 |
| JP | 2001-178062 | 6/2001 |
| JP | 2007-166682 A | 6/2007 |
| JP | 2013-207141 | 10/2013 |
| JP | 2015-149852 | 8/2015 |
| JP | 2015149852 A * | 8/2015 |
| JP | 2016-021811 A | 2/2016 |
| JP | 2016-073115 | 5/2016 |
| KR | 10-2011-0078262 | 7/2011 |
| KR | 10-1448511 | 10/2014 |
| KR | 101448511 B1 * | 10/2014 |

OTHER PUBLICATIONS

Jeon Byeong Seon, Sealed Complex Terminal Connector, Oct. 13, 2014, Se Yang Co. LTD, KR 101448511 (English Machine Translation) (Year: 2014).*
European Search Report dated Dec. 16, 2019 issued in Application No. 17813489.6.
International Search Report dated Aug. 8, 2017 issued in Application No. PCT/KR2017/005154.
Chinese Office Action dated Jun. 2, 2020 issued in Application No. 201780037627.6.
Japanese Office Action dated May 11, 2021 issued in Application 2018-564893.

* cited by examiner

MOTOR CONNECTOR AND MOTOR HAVING SAME

CROSS-REFERENCE TO RELATED PATENT APPLICATIONS

This application is a U.S. National Stage Application under 35 U.S.C. § 371 of PCT Application No. PCT/KR2017/005154, filed May 18, 2017, which claims priority to Korean Patent Application No. 10-2016-0074249, filed Jun. 15, 2016, whose entire disclosures are hereby incorporated by reference.

TECHNICAL FIELD

The teachings in accordance with exemplary and non-limiting embodiments of this invention relate generally to a motor connector and a motor having the same, and more particularly to a motor connector configured to be used for a dual clutch transmission improved in hermeticity (sealing, airtightness) by preventing introduction of moisture or foreign object from outside and a motor having the motor connector.

BACKGROUND ART

In general, motors are used in various sectors of industrial fields. A type of motor, called a BLDC (Brushless DC) motor, is used for a DCT (Dual Clutch Transmission) applied to transmissions of a vehicle, electric propulsion engines and electric vehicles.

A motor used for DCT may include a connector in order to provide electricity or a control signal from outside to the motor.

A motor operated along with a vehicle under a harsh environment such as moisture and water on a road, and snows piled on a road and a connector mounted on a motor require high hermeticity characteristics and high airtightness against the moisture and humidity that may cause a motor with an erroneous operation by infiltration of moisture and humidity.

In general, a connector coupled to a motor used for a DCT may be indirectly measured in hermeticity and airtightness through an air leak test.

The air leak test for hermeticity characteristic and airtightness of a motor and connector is implemented by measuring a degree of leaked air by providing air of a predetermined pressure into the motor and the connector coupled to the motor.

The air leak to be generated from a connector and a motor is largely generated by a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector.

When moisture or humidity is introduced through the connector due to various reasons, the moisture or humidity introduced into the connector may generate an erroneous operation of motor.

DETAILED DESCRIPTION OF THE INVENTION

Technical Subject

The present invention provides to a motor connector configured to improve hermeticity and airtightness and to prevent an erroneous operation of motor despite a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector, and a motor having the motor connector.

Technical Solution

In one general aspect of the present invention, there is provided a motor connector, comprising: a wiring unit including an electric wire having a conductive wire exposed from an insulating sheath, and a terminal coupled to the conductive wire and having a terminal part formed on the end portion thereof; a base including a first molding part having the terminal part disposed therein, and a second molding part extending outwards from the first molding part and having a receiving space for receiving the conductive wire and a part of the insulating sheath adjacent to the conductive wire; a fixing member coupled to the second molding part and covering the sheath so as to fix the same; and a molding member molding the first molding part and the second molding part.

Preferably, but not necessarily, the electric wire of motor connector may include a plurality of electric power source wires applied with a power source and a plurality of sensing wires inputted and outputted with sensing signals.

Preferably, but not necessarily, the second molding part of motor connector may include a floor part and a plurality of lateral wall parts upwardly extended from an edge of the floor part to form the space, wherein the floor part may include a staircase (stepped portion) upwardly protruded from an upper surface of floor part, and the floor part may include a slit-shaped terminal reception groove concavely formed at an upper surface of the staircase, and any one of the plurality of lateral wall parts may be formed with an electric wire reception groove disposed with the electric wire.

Preferably, but not necessarily, an inner wall of the terminal reception groove at the motor connector may be protrusively formed with a protrusion to prevent the terminal from being disengaged.

Preferably, but not necessarily, the lateral wall part of second molding part formed with the electric wire reception groove of motor connector may be formed with a first coupling part coupled with the first fixing member and a second coupling part coupled with the first coupling part.

Preferably, but not necessarily, the molding member of motor connector may include any one of rubber, epoxy and silicon having flexibility and adhesive property.

Preferably, but not necessarily, the first molding part of motor connector may include a trench-shaped groove formed along an upper edge of first molding part about a center of first molding part, wherein the trench-shaped groove may be formed with a sealing ring filled with the molding member formed at the second molding part.

Preferably, but not necessarily, the motor connector may further comprise a cover coupled with the base.

Preferably, but not necessarily, a groove passed through by the terminal may be formed at a border between the first molding part and the second molding part.

In another general aspect of the present invention, there is provided a motor, comprising: a motor connector including a wiring unit including an electric wire having a conductive wire exposed from an insulating sheath, and a terminal coupled to the conductive wire and having a terminal part formed on the end portion thereof; a base including a first molding part having the terminal part disposed therein, and a second molding part extending outwards from the first molding part and having a receiving space for receiving the conductive wire and a part of the insulating sheath adjacent to the conductive wire; a fixing member coupled to the second molding part and covering the sheath so as to fix the same; and a molding member molding the first molding part and the second molding part; a bearing disposed at a center of the base; and a motor body including an axis coupled with the bearing.

Advantageous Effects

The motor connector and motor having the same can prevent an erroneous operation of motor by improving hermeticity (sealing) and airtightness despite a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector.

BEST MODE

The present invention to be explained hereunder may have various variations, and exemplary embodiments, and particular exemplary embodiments will be exemplified through drawings and explained in detail in the detailed description of the present invention.

The present subject matter may, however, be embodied in many different forms and modifications, and should not be construed as limited to the specific embodiments set forth herein. It will be appreciated that the described aspect is intended to embrace all such alterations, modifications, and variations that fall within the scope and novel idea of the present invention. Accordingly, in describing the present invention, detailed descriptions of well-known art may be omitted to avoid obscuring appreciation of the invention.

As used herein, the singular forms "a," "an" and "the" are intended to include the plural forms as well, unless the context clearly indicates otherwise. It will be further understood that the terms "comprises", "includes" and/or "comprising," "including" when used in this specification, specify the presence of stated features, integers, Steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another.

Figure 1:
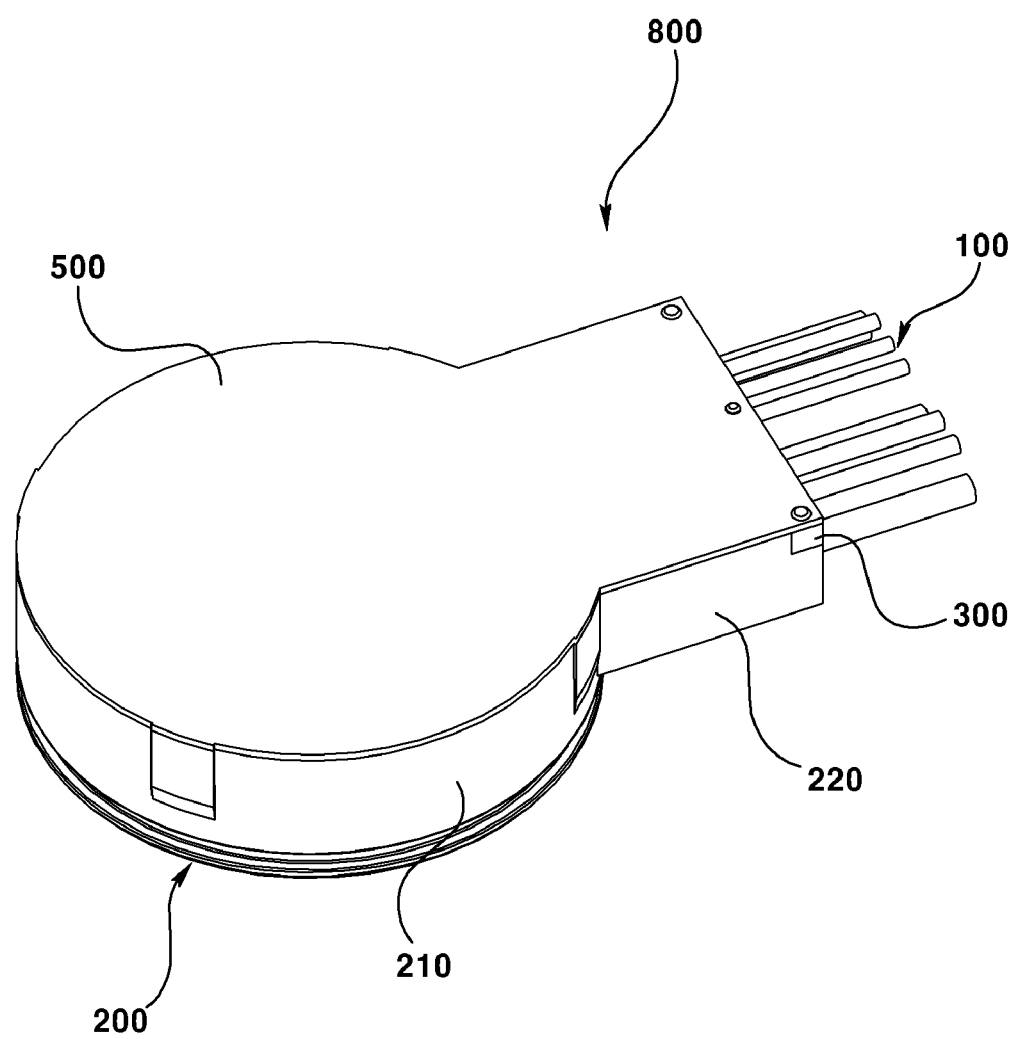
FIG. 1 is a schematic perspective view of exterior look of motor connector according to an exemplary embodiment of present invention.
Figure 2:
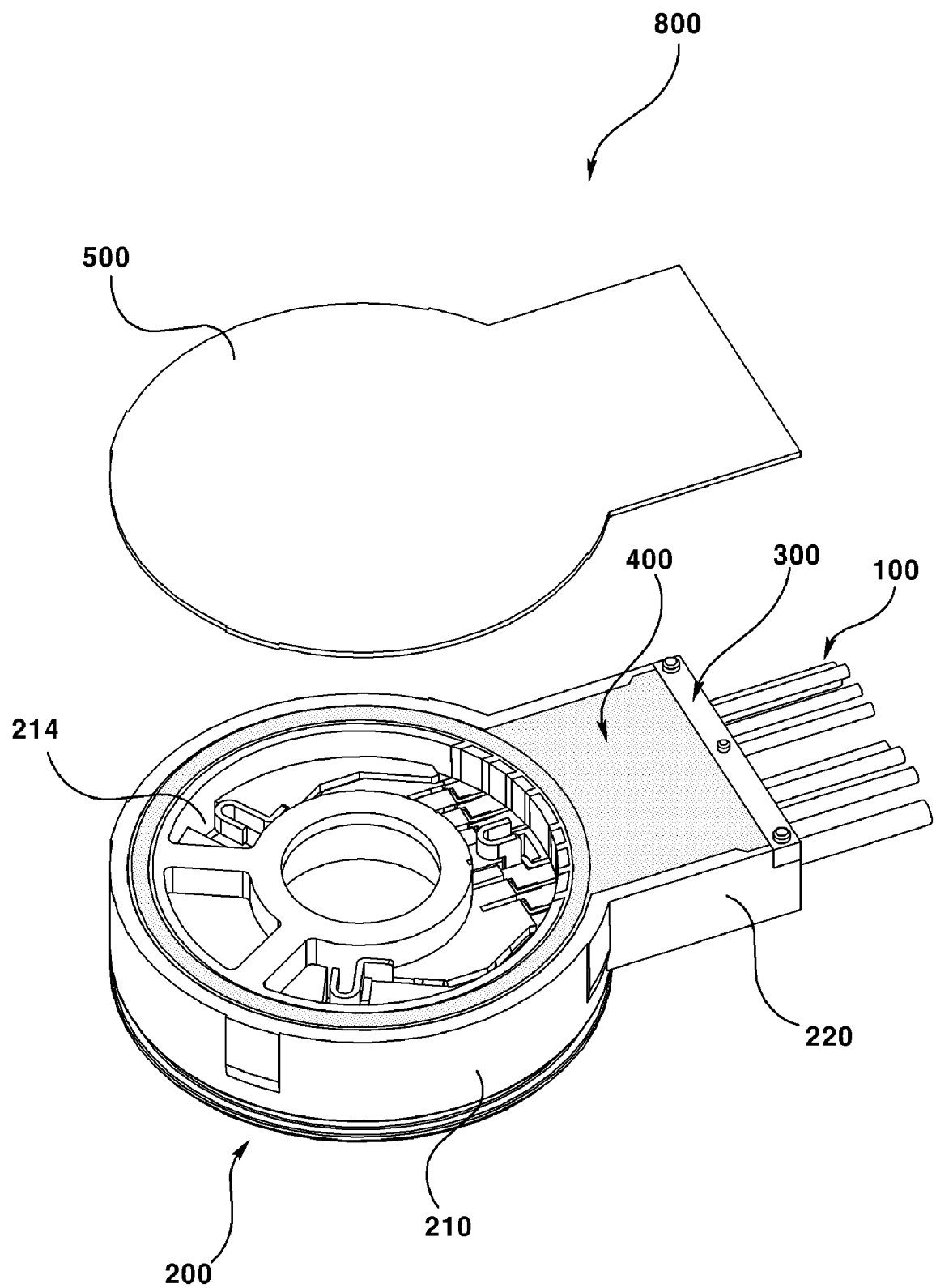
FIG. 2 is an exploded perspective view illustrating a cover of motor connector of FIG. 1.

FIG. 1 is a schematic perspective view of exterior look of motor connector according to an exemplary embodiment of present invention, and FIG. 2 is an exploded perspective view illustrating a cover of motor connector of FIG. 1.

Referring to FIGS. 1 and 2, a motor connector (800) may include a wiring unit (100), a base (200), a fixing member (300) and a molding member (400). In addition, the motor connector (800) may further include a cover (500) coupled with the base (200).

Figure 3:
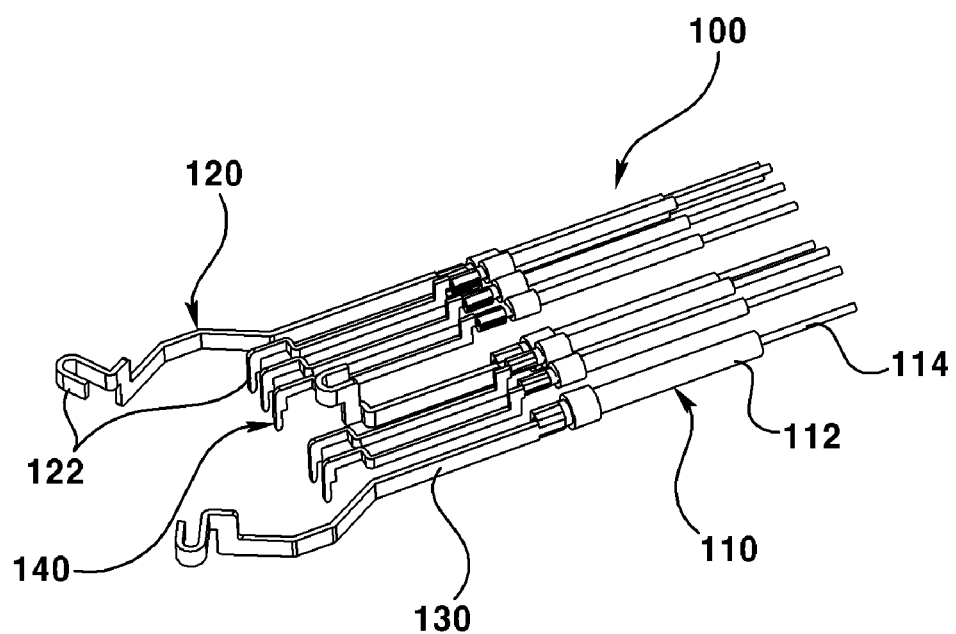
FIG. 3 is a schematic perspective view illustrating a wiring unit of FIG. 2.

FIG. 3 is a schematic perspective view illustrating a wiring unit of FIG. 2.

Referring to FIG. 3, the wiring unit (100) may include an electric wire (110) and a terminal (120).

The electric wire (110) may include an insulating sheath (112) and a conductive wire (114, or core wire) wrapped by the insulating sheath (112), and a distal end of the insulating sheath (112) may be removed from the conductive wire (114) and as a result, the distal end of the insulating sheath (112) may be exposed to outside.

The terminal (120) may be electrically connected to a distal end of the conductive wire (114) exposed by the insulating sheath (112). For example, the terminal (120) may be connected to the conductive wire (114) exposed by the insulating sheath (112) by a clamping method. Alternatively, the terminal (120) and the conductive wire (114) may be electrically connected by various methods including welding and coupling.

The terminal (120) may be manufactured with a conductive material, for example, and a distal end of terminal (120) may be formed with a ring-shaped or bent shaped terminal part (122). The distal end of terminal (120) may be electrically connected to a terminal part of motor.

In an exemplary embodiment of the present invention, the wiring unit (100) including the electric wire (110) and the terminal (120) may be classified to an electric power source wire (130) and a sensing wire (140) depending on types of applied signals.

The electric power source wire (130) may provide an electric power to the motor, and the sensing wire (140) may input or output a control signal or a sensing signal.

In an exemplary embodiment of present invention, the electric power source wire (130) may be formed with three pieces to allow being applied with a 3-phase electric power, for example, and the sensing wire (140) may be formed with 5 pieces, for example.

Figure 4:
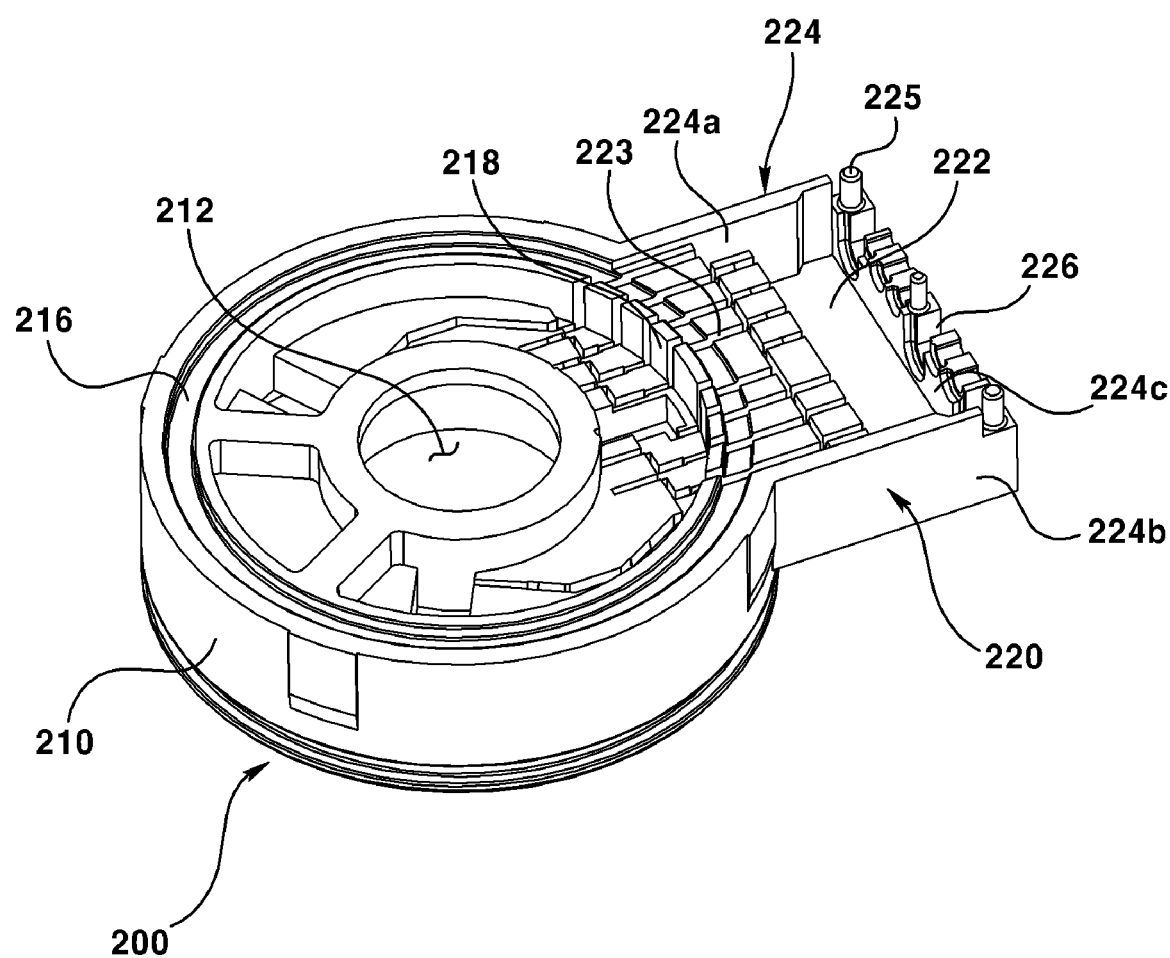
FIG. 4 is a perspective view illustrating a base of FIG. 2.

FIG. 4 is a perspective view illustrating a base of FIG. 2.

Referring to FIG. 4, the base (200) may include a first molding part (210) and a second molding part (220).

The first molding part (210) may be an area coupled to an axis of motor, and the first molding part (210) may be formed at a center thereof with a through hole (212) in order to mount a bearing coupled with an axis of a motor.

The first molding part (210) may be manufactured with various shapes, but the first molding part (210) according to an exemplary embodiment of present invention may be formed with a short cylindrical shape.

Three holes (214) passing through the first molding part (210), each spaced apart at an equidistance, may be formed about the through hole (212) of the first molding part (210), as illustrated in FIGS. 2 and 4. The said three holes (214) formed around the through hole (212) of first molding part (210) may be respectively disposed with a terminal part (122) of terminal (120).

Meantime, an upper surface of first molding part (210) may be formed with a trench-shaped groove (216) along an edge of the upper surface.

The second molding part (220) may be formed by being extended outside of first molding part (210).

The second molding part (220) may provide a reception space accommodating portions of electric wire (110) and terminal (120) illustrated in FIG. 3, and accommodating a molding member (400, see FIG. 2) that prevents moisture and humidity from being introduced into the first molding part (210) from the second molding part (220).

The second molding part (220) may include a floor part (222) and a lateral wall part (224) in order to form the reception space.

The floor part (222) of second molding part (220) may be formed with a plate shape and outwardly extended from the first molding part (210). In the exemplary embodiment of the present invention, the floor part (222) of second molding part (220) may be formed with a staircase (stepped portion) having a height difference.

An area, where a height is relatively higher on the floor part (222) formed with the staircase, may be formed with a terminal reception groove (223) to a direction facing to a lower surface from an upper surface.

The terminal reception groove (223) may be formed with a slip shape, for example, and inserted into the terminal (120), where the terminal (120) inserted into the terminal reception groove (223) may not horizontally move inside the second molding part (220).

Although the terminal (120) inserted into the terminal reception groove (223) may not horizontally move inside the second molding part (220), the terminal (120) may still move to a vertical direction inside the second molding part (220).

Figure 5:
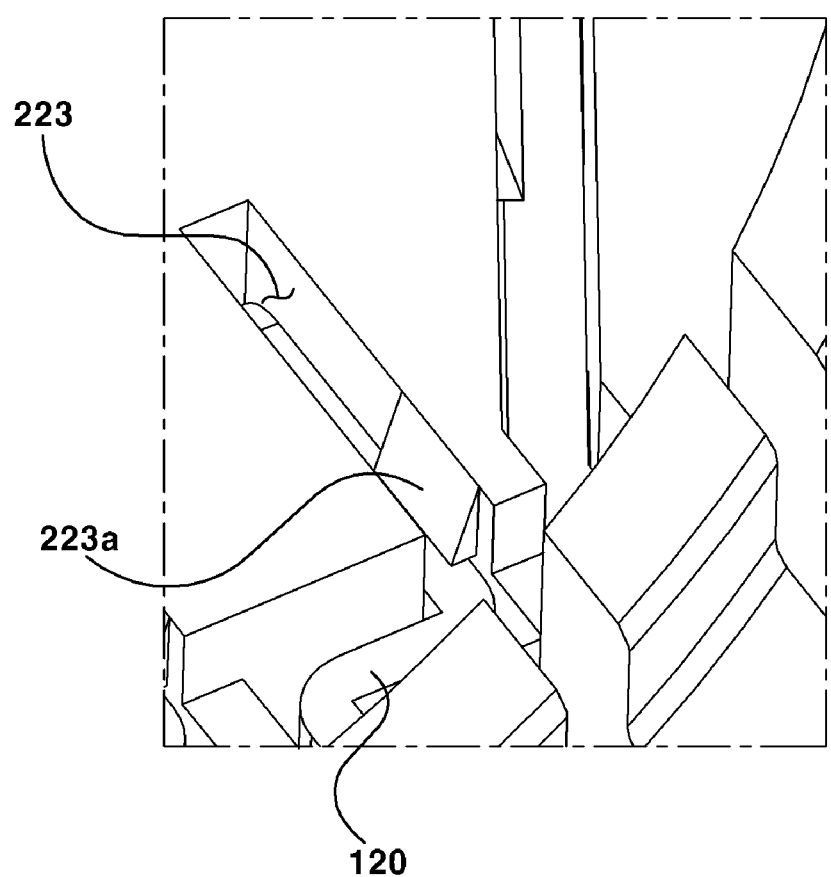
FIG. 5 is a perspective view illustrating a protrusion formed at the base.

FIG. 5 is a perspective view illustrating a protrusion formed at the base.

Referring to FIG. 5, an inner lateral surface formed by the terminal reception groove (223) formed to prevent the terminal (120) inserted into the terminal reception groove (223) from moving to a vertical direction may be formed with a protrusion (233a) according to an exemplary embodiment of present invention.

The protrusion (223a) may prevent the terminal (120) from moving to a vertical direction inside the terminal reception groove (223) by pressing an upper surface of terminal (120) inserted into the terminal reception groove (223), for example.

The protrusion (223a) may help allow the terminal (120) to be smoothly inserted into the terminal reception groove (223), and, after the terminal (120) is inserted into the terminal reception groove (223), a lateral surface of protrusion (223a) may be slantly formed relative to an inner lateral surface formed by the terminal reception groove (223) in order to prevent the terminal (120) from arbitrarily being disengaged, and a lower surface of protrusion (223a) may be formed in parallel with the floor part (222).

Referring to FIG. 4 again, the lateral wall surface (224) of second molding part (220) may include a first lateral wall part (224a), a second lateral wall part (224b) and a third lateral wall part (224c).

The first to third lateral wall parts (224a,224b,224c) may be respectively extended from an edge of floor part (222) toward an upper surface, and a reception space may be formed inside of the second molding part (220) by the first to third lateral wall parts (224a,224b,224c) and the floor part (222).

Distal ends of first and second lateral wall parts (224a, 224b) contacting the third lateral wall part (224c) may be respectively formed with a first coupling part (225). Each of the first coupling parts (225) may take a protruding pillar shape, for example, and may be coupled to a fixing member (300, described later).

The third lateral wall part (224c) may be formed with an electric wire reception groove (226) in order to prevent interference with the electric wire (110) of wiring unit (100) illustrated in FIG. 3.

The size and depth of electric wire reception groove (226) may be formed to correspond to a diameter of electric wire (110), and the electric wire reception groove (226) may be differently formed depending on the diameter of electric wire (110).

A blocking wall (218) may be formed between the first and second molding parts (210, 220) in order to prevent the molding member (400) from being excessively leaked, and the blocking wall (218) may be formed with a groove to prevent the interference with the terminal (120) according to an exemplary embodiment of present invention.

Figure 6:
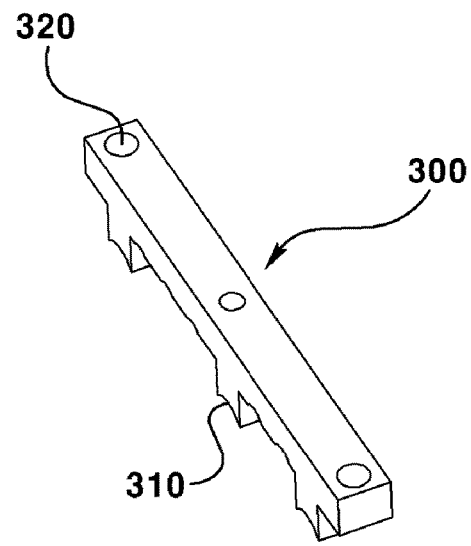
FIG. 6 is a perspective view illustrating a fixing member according to an exemplary embodiment of present invention.
Figure 7:
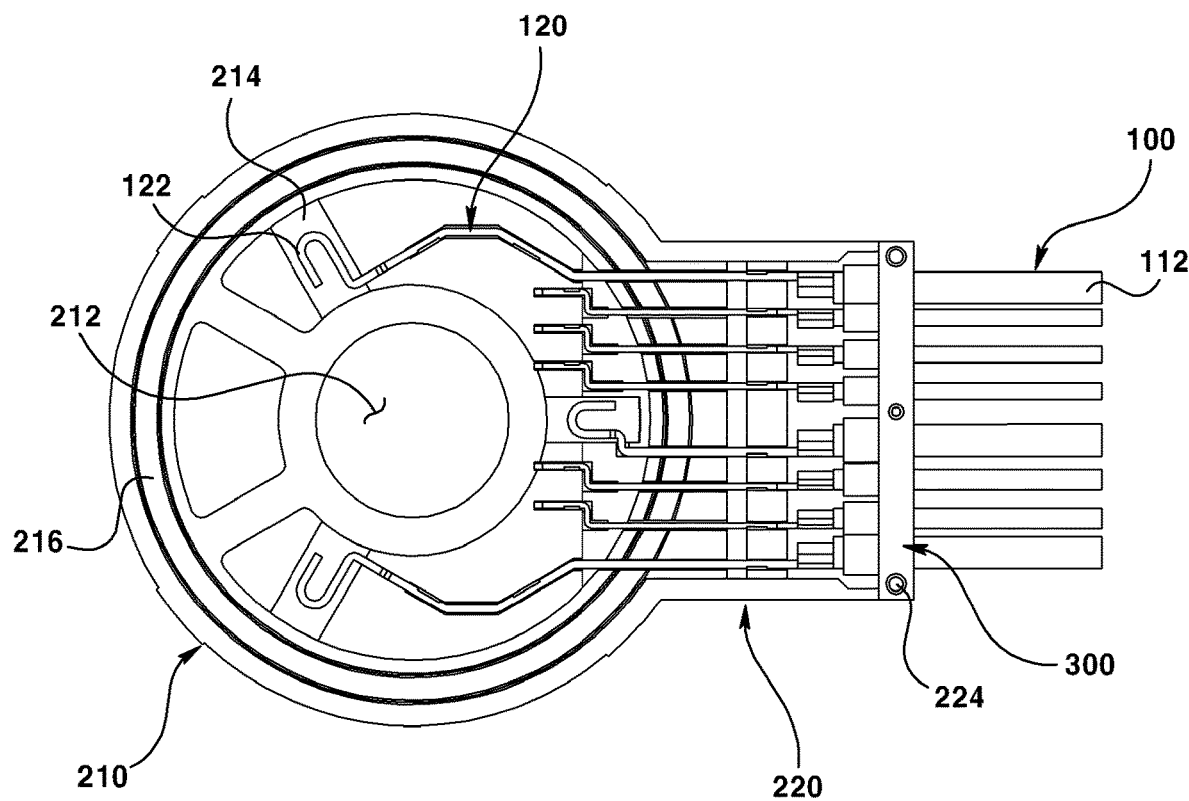
FIG. 7 is a plane view illustrating a wiring unit, an electric wire and a fixing member being coupled.

FIG. 6 is a perspective view illustrating a fixing member according to an exemplary embodiment of present invention, and FIG. 7 is a plane view illustrating a wiring unit, an electric wire and a fixing member being coupled.

Referring to FIGS. 6 and 7, the fixing member (300) may prevent the insulating sheath (112) from being disengaged from the third lateral wall part (224c) of second molding part (220) by pressing the insulating sheath (112) in the wiring unit (100) inserted into the second molding part (220), and may allow forming a reception space inside the second molding part (220).

The fixing member (300) may be formed with a rod shape corresponding to that of the third lateral wall part (224c).

For example, a lower surface facing the third lateral wall part (224c) on the rod-shaped fixing member (300) may be formed with a concave/convex (凹凸) part (310) that presses the insulating sheath (112) of electric wire (110). The length of the concave/convex (凹凸) part (310) formed at the fixing member (300) may be differently formed depending on a diameter of the electric wire (110).

The fixing member (300) may be formed with a second coupling part (320) formed on the second molding part (220) and coupled to the first coupling part (225) illustrated in FIG. 4.

The first coupling part (225) formed on the second molding part (220) according to an exemplary embodiment of present invention may be formed with a pillar shape, for example, and the second coupling part (320) formed on the fixing member (300) may be formed with a groove or a hole shape coupled by being inserted into the first coupling part (225).

Although the exemplary embodiment of present invention has illustrated and explained that the first coupling part (225) is formed with a pillar shape, and the second coupling part (320) is formed with a groove or a hole shape, alternatively, it may be possible that the first coupling part (225) is formed with a groove or a hole shape, and the second coupling part (320) is formed with a pillar shape.

Referring to FIG. 2 again, the molding member (400) may be filled in the reception space formed on the second molding part (220) to prevent moisture or humidity from being introduced into the first molding part (210) through the second molding part (220).

The molding member (400) may be formed by an LSR (Liquid Silicon Rubber) injection method, for example.

A material to form the molding member (400) may be used with a material having flexibility (or elasticity) and adhesive physical property when cured after being injected in a liquid state.

For example, a material useable for the molding member (400) may be one of rubber material, an epoxy material and silicon material that has flexibility and adhesive physical property when cured after being injected in a liquid state.

In the exemplary embodiment of present invention, when the molding member (400) is formed inside a reception space formed at the second molding part (220), the molding member (400) can prevent the degradation in sealing performances, despite a difference of expansion coefficient between the insulating sheath (112) and second molding part (220), a difference of expansion coefficient between the conductive wire (114) and the second molding part (220) and a difference of expansion coefficient between the terminal (120) and the second molding part (220) because the molding member (400) respectively encompasses a joined area between the insulating sheath (112) of electric wire (110), the conductive wire (114) of electric wire (110) and the conductive wire (114) and the terminal (120).

Particularly, the molding member (400) has both flexibility and adhesive physical property to prevent generation of a gap caused by deviation of expansion coefficient whereby introduction of moisture or humidity into the first molding part (210) through the second molding part (220) can be fundamentally prevented.

Meantime, in the exemplary embodiment of present invention, a portion of molding member (400) is also provided to a trench-shaped groove (216) when the molding member (400) is formed on the second molding member (220) using an LSR injection method, and the molding member (400) provided to the trench-shaped groove (216) may function as a sealing ring (or O-ring).

Thus, the number of parts for assembly and the number of assembly processes may be reduced because a separate sealing ring is dispensed with by providing a portion of molding member (400) to the trench-shaped groove (216) formed on the first molding part (210).

Figure 8:
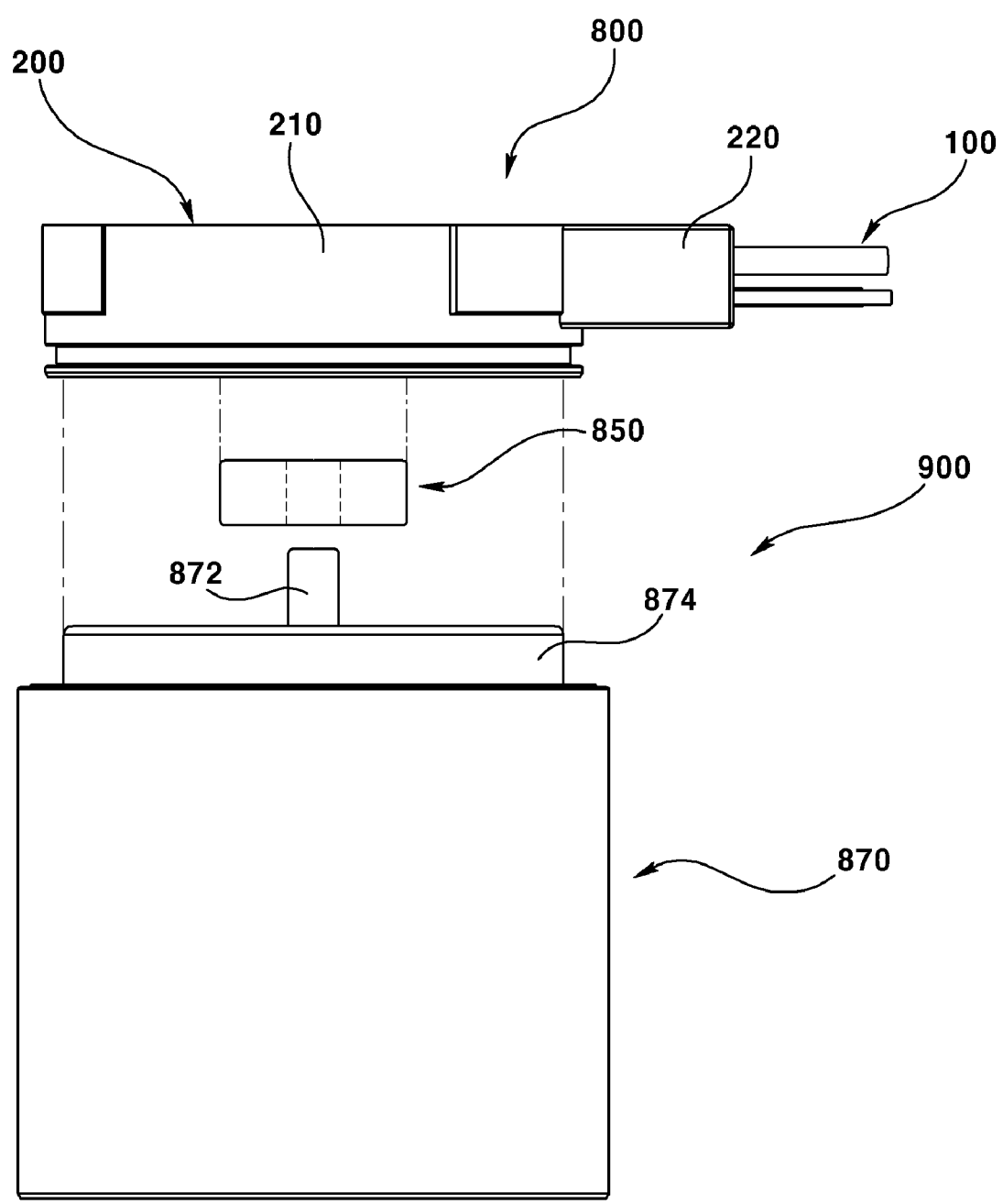
FIG. 8 is an exploded view of a motor having a motor connector according to an exemplary embodiment of present invention.

FIG. 8 is an exploded view of a motor having a motor connector according to an exemplary embodiment of present invention.

The motor connector of a motor illustrated in FIG. 8 may have a substantially same configuration as that of the motor connector illustrated in the previous FIGS. 1-7. Thus, like numbers refer to like elements throughout and explanations that duplicate one another will be omitted.

Referring to FIG. 8, the motor (900) may comprise a bearing (850), a motor connector (800) and a motor body (870).

The base (200) of motor connector (800) may be coupled by a bearing (850).

The motor body (870) may include a rotation shaft (872), a rotor rotating the rotation shaft (872) and a stator wrapping the rotor, and an upper end of motor body (870) may be formed with a sealing part (874) coupled to the base (200) of motor connector (800).

The sealing part (874) may function to prevent introduction of moisture or foreign object from outside when coupled with the base (200).

As explained in detail from the foregoing discussion, the present invention can improve hermeticity and airtightness and prevent an erroneous operation of motor, despite a difference of expansion coefficient between a terminal transmitting a power and sensing signal and a mold forming a body of connector, a difference of expansion coefficient between a cable sheath and a mold forming a body of a connector, and a difference of expansion coefficient between a core wire wrapped by the cable sheath and a mold forming a body of a connector, and a motor having the motor connector.

Meantime, the exemplary embodiments disclosed in the drawings have been provided to assist in a comprehensive understanding of the embodiments of the invention. Accordingly, those of ordinary skill in the art will recognize that various changes and modifications of the embodiments described herein can be made without departing from the scope and spirit of the invention.

INDUSTRIAL APPLICABILITY

The present invention may be applicable to a connector applied to a motor for a DCT (Dual Clutch Transmission) and to the DCT.

The invention claimed is:

1. A motor connector, comprising:
a wiring unit including an electric wire having a conductive wire exposed from an insulating sheath, and a terminal coupled to the conductive wire and having a terminal part formed on an end portion thereof;
a base including a first molding part having the terminal part disposed therein, and a second molding part extending outwards from the first molding part and having a reception space for receiving the conductive wire and a part of the insulating sheath adjacent to the conductive wire, wherein the first molding part includes a trench-shaped groove formed along an upper edge of the first molding part about a center of the first molding part having the terminal part disposed therein;
a fixing member coupled to the second molding part and covering the insulating sheath so as to fix the same; and
a molding member that includes a first molding member portion disposed within the reception space of the second molding part and a second molding member portion disposed within the trench-shaped groove of the first molding part having the terminal part disposed therein.

2. The motor connector of claim 1, wherein the electric wire of the motor connector includes a plurality of electric power source wires applied with a power source and a plurality of sensing wires inputted and outputted with sensing signals.

3. The motor connector of claim 1, wherein the second molding part of the motor connector includes a floor part and a plurality of lateral wall parts upwardly extended from an edge of the floor part to form the reception space, wherein the floor part includes a staircase upwardly protruded from an upper surface of the floor part, and the floor part includes a slit-shaped terminal reception groove concavely formed at an upper surface of the staircase, and any one of the plurality of lateral wall parts is formed with an electric wire reception groove disposed with the electric wire.

4. The motor connector of claim 3, wherein an inner wall of the terminal reception groove at the motor connector is protrusively formed with a protrusion to prevent the terminal from being disengaged.

5. The motor connector of claim 4, wherein a lateral surface of the protrusion is slantly formed relative to an inner lateral surface formed by the terminal reception groove, and the protrusion is formed at a lower surface in parallel with the floor part of the terminal reception groove.

6. The motor connector of claim 4, wherein the terminal is disposed at a lower surface of the protrusion.

7. The motor connector of claim 3, wherein the lateral wall part of the second molding part formed with the electric wire reception groove of the motor connector is formed with a first coupling part coupled with the fixing member, and the fixing member is formed with a second coupling part coupled with the first coupling part.

8. The motor connector of claim 7, wherein the first coupling part is upwardly and protrusively formed from an upper surface of the lateral wall part, and the second coupling part has a groove shape or a hole shape to couple to the first coupling part.

9. The motor connector of claim 8, wherein a blocking wall is formed with a groove in which the terminal is accommodated.

10. The motor connector of claim 1, wherein the molding member of the motor connector includes any one of rubber, epoxy and silicon having flexibility and adhesive property.

11. The motor connector of claim 1, wherein the molding member is formed as one body that includes the first molding member portion disposed within the reception space of the second molding member and the second molding member portion disposed within the trench-shaped groove of the first molding member.

12. The motor connector of claim 1, wherein a lower surface of the fixing member is formed with a concave/convex part that presses the insulating sheath.

13. The motor connector of claim 1, further comprising a cover coupled with the base.

14. The motor connector of claim 1, wherein a groove passed through by the terminal is formed at a border between the first molding part and the second molding part.

15. The motor connector of claim 1, wherein a blocking wall is configured to prevent leakage of the molding member, and is formed between the first molding part and the second molding part.

16. A motor, comprising:
a motor connector including:
 a wiring unit including an electric wire having a conductive wire exposed from an insulating sheath; and
 a terminal coupled to the conductive wire and having a terminal part formed on an end portion thereof;
 a base including a first molding part having the terminal part disposed therein, and a second molding part extending outwards from the first molding part and having a reception space for receiving the conductive wire and a part of the insulating sheath adjacent to the conductive wire, wherein the first molding part includes a trench-shaped groove formed along an upper edge of the first molding part about a center of the first molding part having the terminal part disposed therein;
 a fixing member coupled to the second molding part and covering the sheath so as to fix the same; and
 a molding member including a first molding member portion disposed within the reception space of the second molding part and a second molding member portion disposed within the trench-shaped groove of the first molding part having the terminal part disposed therein;
a bearing disposed at a center of the base; and
a motor body including an axis coupled with the bearing.

17. The motor of claim 16, wherein the second molding part of the motor connector includes a floor part and a plurality of lateral wall parts upwardly extended from an edge of the floor part to form the reception space, wherein the floor part includes a staircase upwardly protruded from an upper surface of the floor part, and the floor part includes a slit-shaped terminal reception groove concavely formed at an upper surface of the staircase, and any one of the plurality of lateral wall parts is formed with an electric wire reception groove disposed with the electric wire.

18. The motor of claim 16, wherein the molding member is formed as one body that includes the first molding member portion disposed within the reception space of the second molding member and the second molding member portion disposed within the trench-shaped groove of the first molding member.

19. The motor of claim 16, wherein the molding member includes any one of rubber, epoxy and silicon having flexibility and adhesive property.

20. The motor of claim 16, wherein a groove passed through by the terminal is formed at a border between the first molding part and the second molding part.

* * * * *